(12) United States Patent
Dema (10) Patent No.: US 8,355,964 B2
(45) Date of Patent: Jan. 15, 2013

(54) AUDITOR'S TOOLBOX

(75) Inventor: Robert Dema, Great Bend, KS (US)

(73) Assignee: CMFG Life Insurance Company, Madison, WI (US)

(*) Notice: Subject to any disclaimer, the term of this patent is extended or adjusted under 35 U.S.C. 154(b) by 436 days.

(21) Appl. No.: 11/747,865

(22) Filed: May 11, 2007

(65) Prior Publication Data

US 2008/0059345 A1    Mar. 6, 2008

Related U.S. Application Data

(60) Provisional application No. 60/842,023, filed on Sep. 5, 2006.

(51) Int. Cl.
*G07B 17/00* (2006.01)
*G07F 19/00* (2006.01)

(52) U.S. Cl. .......................... 705/30; 705/36 R (58) Field of Classification Search ............ 705/1, 36 R, 705/39, 64, 69, 45, 36; 707/102; 709/227, 709/245; 704/1; 370/351; 364/408
See application file for complete search history.

(56) References Cited

U.S. PATENT DOCUMENTS

| | | | | |
|---|---|---|---|---|
| 5,878,405 A | * | 3/1999 | Grant et al. | 705/39 |
| 6,041,313 A | * | 3/2000 | Gilbert et al. | 705/36 R |
| 2005/0102212 A1 | * | 5/2005 | Roy | 705/36 |

OTHER PUBLICATIONS

Kathryn Cormican, David O'Sullivan, Auditing best practice for effective product innovation management, Technovation, vol. 24, Issue 10, Oct. 2004, pp. 819-829, ISSN 0166-4972, 10.1016/S0166-4972(03)00013-0. (http://www.sciencedirect.com/science/article/pii/S0166497203000130).*

* cited by examiner

*Primary Examiner* — Matthew Gart
*Assistant Examiner* — Rokib Masud
(74) *Attorney, Agent, or Firm* — Merek, Blackmon & Voorhees, LLC (57) ABSTRACT

A system and method for managing and providing selective access to automated data regarding daily valued defined contribution plans. More particularly, the present invention relates to systems and methods for managing accounting data between one or more clients and one or more administrators and one or more users (e.g., auditors, vendors, sub-vendors, etc.) and preferably presented to a third party via an interface which collects the information in a first format and displays the information in second format. The data is thus available to auditors using a template, different from the normal order in which the data is collected or used, which arranges the data and customizable reports in an order and fashion according to standard accounting plans or a comparable order in which the auditor will need the data and reports while auditing a defined contribution plan to prepare, for example, a form 5500 report.

25 Claims, 2 Drawing Sheets

AUDITOR'S TOOLBOX

This application claims the benefit of U.S. Provisional application 60/842,023, filed Sep. 5, 2006, which is incorporated herein by reference.

BACKGROUND OF THE INVENTION

1. Field of the Invention

The present invention relates to a system and method for managing and providing selective access to automated data regarding daily valued defined contribution plans. More particularly, the present invention relates to systems and methods for managing accounting data between one or more clients and one or more administrators and one or more users (e.g., auditors, vendors, sub-vendors, etc.) and preferably presented to a third party via an interface which collects the information in a first format and displays the information in second format.

2. Description of the Prior Art

Daily valued defined contribution plans are becoming more and more popular today as the social security system becomes less able to provide adequate retirement income for retirees. This is especially true as federal officials forecast that the administration will not be able to meet the increased demands as greater numbers of baby boomers retire, thereby stressing the system to its brink.

In response, Congress continues to pass tax incentives for individuals and companies to contribute to personal retirement accounts such as the daily valued defined contribution plan as well as other such devices. However, strict requirements on companies who offer these plans must be met by the companies to allow plan participants to continue to receive the tax benefits. For example, the Internal Revenue Service requires certain audits to be completed for plans having 100 or more participants. Administrators or Sponsors must file audits along with a Form 5500 annual report of Employee Benefit Plan to meet these federal regulations.

However, since the plan sponsor and the independent auditing entity are different parties, all of the data necessary to perform these audits may not be readily available in the form or format needed by the auditor. In the past, auditors have either had to comb through great amounts of files to generate data or have had to review printed reports and filings that may not have information in the exact form needed to prepare an audit.

Great efficiencies may be made by organizing the data for the plan and by providing it on-line in a consistent, predetermined manner so that an auditor can readily access and utilize the data for the audit. According to the present invention, a plan consultant or other accountant or administrator tasked with maintaining the records and data of a plan can provide the sponsor with the option of making accounting and plan data available on-line and password accessible to the outside auditors or other authorized parties, in a predetermined format and order to increase the efficient access to the data by the auditors, reducing the burden of auditing and increasing the transparency of the administration and accounting of the plan. The data may be presented in different formats according to the party viewing the information, for example different screens may be provided to the company employees ("plan members"), the companies themselves, and to third party auditors so that each not only has access to different information, but information in different order.

SUMMARY OF THE INVENTION

Accordingly, It is a principal object of the invention to provide electronic plan data to auditors in a desired format and order such that auditing can be done efficiently and accurately with minimum effort.

It is another object of the invention to provide accounting and plan data on-line to third parties such as auditors to increase transparency of plan administration and accounting.

It is a further object of the invention to provide plan data to third parties to aid auditors in complying with federal auditing mandates to ensure that the plan remains in compliance with ERISA guidelines.

Still another object of the invention is to provide all of the data according to the content and layout provided in "Audits of 401 (k) Plans" as published by AICPA or other accounting guidelines.

It is an object of the invention to provide improved elements and arrangements thereof in an apparatus for the purposes described which is inexpensive, dependable and fully effective in accomplishing its intended purposes.

These and other objects of the present invention will be readily apparent upon review of the following detailed description of the invention and the accompanying drawings. These objects of the present invention are not exhaustive and are not to be construed as limiting the scope of the claimed invention. Further, it must be understood that no one embodiment of the present invention need include all of the aforementioned objects of the present invention. Rather, a given embodiment may include one or none of the aforementioned objects. Accordingly, these objects are not to be used to limit the scope of the claims of the present invention.

BRIEF DESCRIPTION OF THE DRAWINGS

Similar reference characters denote corresponding features consistently throughout the attached drawings.

DETAILED DESCRIPTION OF THE PREFERRED EMBODIMENT(s)

The present invention is to a method and apparatus for simplifying auditing of daily valued defined contribution plans. In a preferred embodiment, a method and apparatus is provided to simplify the audit and review of defined contribution retirement plans and other qualified and nonqualified plans by organizing and presenting data and content on the plans posted in a predetermined format generally according to published accounting guidelines. More preferably an interface is provided on a network having a predetermined format. The interface is used to collect data and/or reports and present the underlying data in the order required by the auditor or other user.

Figure 1:
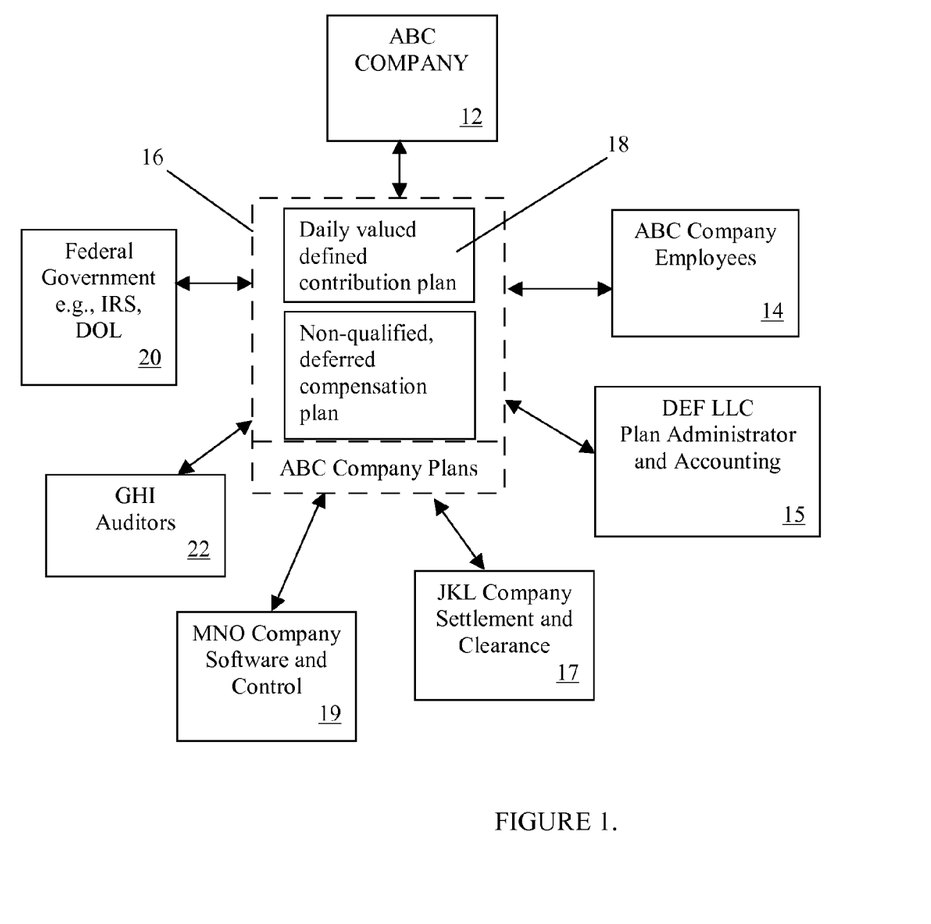
FIG. 1 is diagram showing a daily valued defined contribution plan and the flow of information and resources into and out of the defined contribution plan according to the present invention.

The invention will now be described with regard to a preferred embodiment as shown in the figures. FIG. 1 shows ABC company 12 having a number of employees 14. In order to entice and maintain employees within the company, ABC offers at least one daily valued defined contribution plan 16 from typically an outside party. In this example, a 401(k) plan 18 as defined by the Internal Revenue Service regulations is offered to at least some of the qualifying employees. However, one skilled in the art would appreciate that the invention could apply to any periodic defined contribution plan including profit sharing plans, money purchase pension plans, nonqualified deferred compensation plans, target benefit plans, 401(k), 457 and 403b plans etc., but most specifically to plans that are valued daily.

In order to qualify for tax benefits, the plan will have to meet multiple regulations from the Internal Revenue Service, Department of Labor, etc. A number of parties will likely be involved in ensuring that the plan qualifies. An administrator such as DEF company 15 will establish and provide record keeping and accounting for the plan. Preferably DEF company is independent of ABC company and may administer a number of plans for a number of companies.

The Federal government (IRS, DOL, etc.) 20 will require periodic reports on the plan 18 and may audit or request further information as needed. An independent, third party accounting and auditing company ("GHI Auditors") 22 will review the records and content of the plan and will prepare a report or multiple reports to be submitted to meet the requirements of the Federal Government, internal auditors and/or other parties as needed.

In practice DEF plan administrator maintains many of the records necessary for the auditing company to successfully audit the company. These records may include:

A. the name, address and other official and financial information on the company;
  B. name, address, position, sex, age, race or other census information on the employees;
  C. hours worked and compensation of the employees;
  D. identification of highly compensated employees and/or nonhighly compensated employees;
  E. account balances, contributions by the employee and employer to the plan, interest on and withdrawals from the plan;
  F. any plan tests performed or scheduled for the plan; and
  G. contribution reports.

From the information, the plan administrator may create, offer to create or have created records and reports useful to the auditor in a format other than (or in addition to) that normally provided to clients (e.g., companies, employees and/or plan members) including:

A. SAS 70 Independent Service Auditor's Reports;
  B. Compensation reports;
  C. Plan activity and balance sheets;
  D. Discrimination or other compliance testing;
  E. Plan tax information; and
  F. Plan documents and/or lists of controls and systems for the plan.

Since ABC company is in the business of providing products and services likely unrelated to the daily valued defined contribution plans 16, ABC will be hampered by expending man hours producing records to the GHI Auditors or making its offices and records available to GHI auditors. Many of the documents and records are already available at DEF plan administrator since the administrator services the plan and keeps records of employers and employees, as well as contributions to and withdrawals from the plan.

In a preferred embodiment, DEF plan administrator places a link on ABC company's webpage. This link may be accessible only by signing onto a secure webpage on ABC company's site, or the link may take the user to a secure sign in/log in page on DEF's site. This redirection from the ABC page to the DEF page may be apparent to the user and may include a warning that the user is leaving ABC company's page or may be transparent to the user. Alternatively, DEF plan administrator may provide a website which is directly accessible to third parties, and the sign in/log in page may be provided on such a page for use by the third parties in accessing information about ABC Company.

Upon validation of the user's credentials such as by using previously obtained information or by a third party verification scheme, the user can access files made available for the user by DEF administrator on a plan auditing information webpage. Preferably, the user is an auditor 22 at GHI company, but may be another authorized party, including a federal auditor 20, an ABC company employee, or other official or authorized party.

The information made available to the user may include an interface (e.g., website) screen having a number of reports. More preferably, the information available on the website will include information grouped by pre-arranged categories arranged for use by an auditor. Most preferably, the information will be arranged in an order in which the auditor would likely utilize the information or the order in which the auditor would expect the information to be in. Preferably the information is arranged by content and layout based on the "Audits of 401(k) Plans" published by AICPA. More specifically, the information may be arranged by receiving a third party's (e.g., the AICPA) "predefined audit layout" (e.g., "Audits of 401(k) Plans" published by AICPA.) and presenting information in a content and layout according to the "predefined audit layout."

A user viewing the DEF plan auditing information webpage may be presented with a number of ways of selecting the information to be viewed. The information may be listed by text menu, graphical menu, hyperlink, related code section, index information, etc. Preferably, the information is available by a graphic menu such as that shown in FIG. 2. Additional subtext information may be available to the user on request or automatically as the option is selected, as the user's cursor moves over the selection or by other known web techniques for displaying additional information. The information may be viewed in any order by selecting a box out of order, however, the user is directed by appropriate arrows, numbering, relational context, linking or menu system to simply access each item of information in order. Preferably the layout of the information on the screen naturally leads the user by relational context through the proper order as the user starts at the top most link and proceeds to the adjacent link, that is, the user merely chooses the next category by following the logical ordering provided on the screen.

To aid in understanding the preferred information order, the invention will now be described in the preferred order. The following information is offered by way of example only, and the invention is not limited to the following information and/or phraseology, but only by the accompanying claims.

Figure 2:
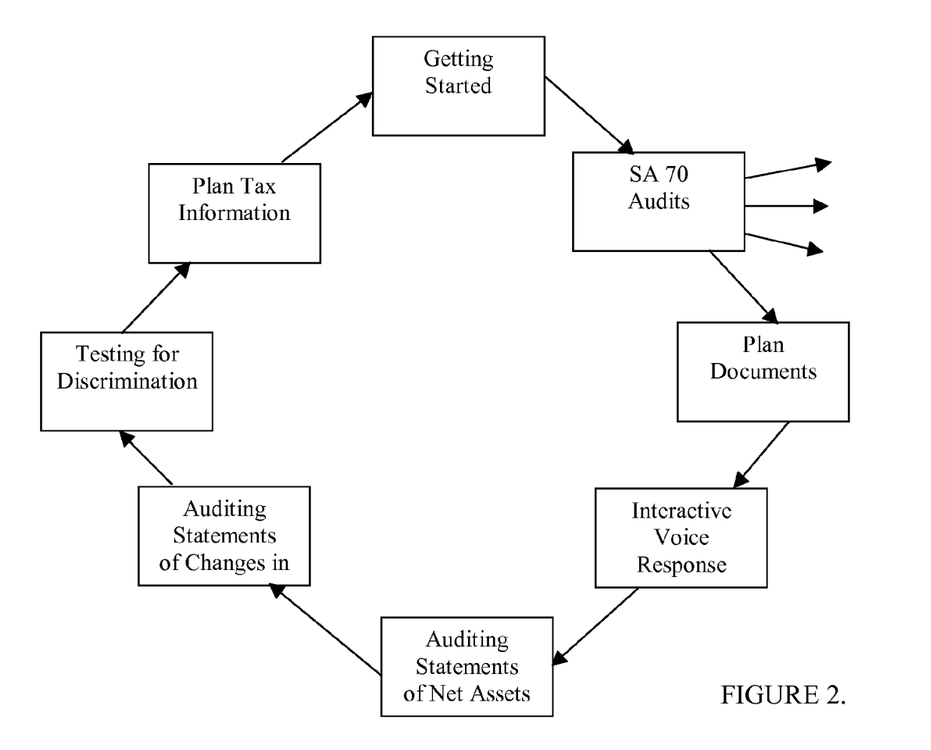
FIG. 2 is a diagram showing the preferred arrangement of auditing reports according to the invention.

As shown in FIG. 2, the user (e.g., an auditor) first selects the "Getting Started" box 120. Upon selection of box 120 or on moving the cursor over or near the selection, the following explanatory information is provided to the user:

A plan subject to the Employment Retirement Income Security Act of 1974 (ERISA) must file a Form 5500 annually for each plan year with 100 or greater participants at the beginning of the plan year. This form requires an audit of the plan financial statements to be attached. The additional side menu items within this website will provide information to aid in the completion of a plan audit. The audit must accompany the Form 5500 and be filed 7 months after the plan year-end or file for an extension. An extension is for an additional 2½ month period. All information is in a 'Read Only' status.

The user then selects to the SAS 70 Audits box, which returns the following information: "There are four SAS 70

Independent Service Auditors Reports available to evaluate controls. Click on the desired link to open the most recent report available." The user then selects one of the four reports, namely information regarding the plan administrator (DEF company 15), the settlement and clearance company (JKL company 17) and other vendors or data processing companies (MNO Company 19) involved in providing the plan or support therefore. In this example, MNO company provides software for processing, auditing, and control of the administration of the plan. Other selections may be available here for other vendors, controls, external audits, etc.

Selection of information regarding plan administrator DEF returns the information "DEF Company is the Third Party Administration firm for this retirement plan. Reports reflect a 12-month period based on a calendar year. DEF has been in business since July 1972 and maintains 3000+plans. Click here to view." The user may then select the report associated with DEF Company. This report may take the form of a separate webpage, but is preferably a separate document such as a PDF, spreadsheet, word processing document, power point, or similar document.

The user then selects the second selection or category, namely information regarding the settlement and clearance group: "JKL Settlement provides settlement and clearance services and unitized trade processing for DEF administrator. Reports reflect a 12 month period based on a September 30 ending date. Click here to view." The user may then proceed to view the report.

The user then selects the third company profile, namely the development and control software creator. Upon selection, the webpage returns the following information and access to a report on the MNO company (see FIG. 5): "MNO Company provides CPI's development and support of daily software. Reports reflect a 12-month period based on a calendar year. Click here to view."

After completing a review of the companies involved in the operation of the administration of the plan and any other significant vendors or providers for the plan, the user selects the "Plan Document" 124 from the main menu to see documents and information regarding the plan itself, which includes the description: "The Adoption Agreement, the basic plan document and any appendices constitute the Employer's Plan and Trust document." The submenu to this selection may include information regarding the adoption agreement itself (including the retirement plan and trust provisions), amendments to the plan or the agreement, provisions on how the plan should operate, determination letters, and enrollment or other administrative documents.

To aid in understanding the Plan, summary documents are preferably made available to the user. One such document is the Summary Plan Description that is normally provided to every participant. The Summary Plan Description describes in layman's terms the plan provisions.

Having completed the Plan Documents 124 section, the user then selects the "Interactive Voice Response (IVR) and Website" which provides information regarding the IVR and website: "Clients may choose to complete enrollment on-line or initially using a paper form. After the initial paper signup choosing election percents to the funds, all future changes must be made through either the IVR or the plan website. This would include, but not limited to, election transfers to future and/or existing assets, transfers between funds. There is no on-going paper trail."

The user then reviews the "Auditing Statements of Net Assets," which reveals the following description:

The ERISA report is made up of several sections and may include separate reports for cash basis and accrual basis reports. The Asset Summary provides Net Assets as of the beginning of the year and the end of the year. You can navigate within this report by scrolling up and down. This plan financial statement may be reconciled with the information certified by the trustee. Confirming contributions and withdrawals to a mutual fund statement may be tracked on the Account Reconciliation by Fund or Contributions pages. Contributions are separated by Employee and Employer. Dates contributions were purchased into funds are reflected on the Contributions page. Employee contributions are first listed followed by Employer contributions. Purchase dates can be reconciled against client payroll records. An ERISA report may be attached showing the above information.

The user could then review the information provided by JKL Settlement and Clearing Services, preferably including Certified Statements of the funds to assist with the reconciliation process. The statement would then be available by clicking on the appropriate link.

Additional information may be available on the Auditing Statements of Net Assets 128 such as the Participant Loan Program setting forth the rules and guidelines to allow Participant Loans, which the user may click to view.

A promissory note may be viewable, if applicable, showing the individual Promissory Notes. It may be necessary to select the Loan option within the Distribution Type box to list loans from the plan. Loans may be sorted by Plan year and social security number. The user may reconcile the individual participant account records with the plan sponsor's records to determine the total of all the individual participants' accounts equals the total of all allocated plan assets. One skilled in the art would recognize that the principle payments reduce the loan account. Principle and Interest Payments would generally be reinvested into the funds per the elections in effect at the time of the repayment. Interest is netted within Earnings. The Amortization Schedule may be displayed automatically with the promissory note, but preferably requires further selection of a related link in order to access this additional information. This related link is preferably displayed with the promissory note or near a link to the promissory note.

Investment Summary Reports available by quarter or year could also be provided within this selection. The user may need to choose a number associated with the desired quarter or year to further identify the report desired. The report for the desired quarter or year could then be viewed by selecting the report.

A Distribution Request Report may also be available. Preferably such a report may be limited by various criteria. For instance, by inserting a date range, the number of distributions appearing in the report can be limited to those of interest. Additional options may be provided to further limit the report and make it more usable for performing the various audit steps.

To continue the review of the auditing reports, the user would then select Auditing Statement of Changes in Net Assets 130. Several reports would be available within this selection including:

A. Earnings generally net all realized and unrealized gains and losses into one number. Confirming contributions and withdrawals to a mutual fund statement may be traced by scrolling to the page titled Form 5500 1a, Account Reconciliation by Fund or to the page titled Form 5500—Schedule 2 Contributions. Contributions are separated by Employee and Employer.

B. Forfeitures reflect the non-vested portion of terminated participants who were paid out of the plan. Monies not fully vested may be used in one or more of the following ways: offset future employer contributions, reallocated to the remaining plan participants or used to pay plan expenses or reinstate the employer portion of account balances for participants who previously left the plan within the past 5 years and returned their vested portion when rehired. (Access the plan adoption agreement under Plan Documents to determine method.)

These reports could then be viewed by the user by clicking on any of the reports (i.e., a hyperlink to the report.)

The user would then proceed to the Testing for Discrimination reports 132, which could contain any number of reports depending the demographics of the participants and any federal, state or local rules for reporting. Moving the cursor over this selection would return the following description: "Compensation by payroll period provided by the client are reflected in this report."

A first selection within this area includes: The Test Help reflects a variety of information used for the tests below including Census Information, Highly Compensated Employees (HCEs), Non-highly Compensated Employees, Compensation, Hours Worked, Account Balances, Contributions, all by participant. A report combining this information may be available to the user.

Another test available to the user is the Annual Additions Test that checks to determine if any participants needed contributions returned due to exceeded limits. A report may be available to the user showing the results of this test in tabular form.

A further test is the Actual Deferral Percentage test (ADP), which checks to determine if elective contribution made by the Highly Compensated Employees require monies to be returned upon test failures. Failure to satisfy this test may result in loss of plan qualification. A report may be provided to the user showing the results of this test and/or a table from which the test may be made by the user.

A yet further test is the Actual Contribution Percentage ("ACP") test, which checks the employer matching and employee contributions for a passing status. Failure to satisfy this test results in loss of plan qualification. A report may be provided to the user showing the results of this test and/or a table from which the test may be made by the user.

Another test is the Top Heavy test, which is completed at the end of the year to determine the following year's status. Balances of Key employees versus Non-key employees are compared to determine if a Top Heavy year may require an employer contribution to satisfy the test. A report may be provided to the user showing the results of this test and/or a table from which the test may be made by the user.

The next menu available from the main directory for the user is Plan Tax Information 134 that includes information on the tax status for the plan. This information may include the following: "A Determination Letter has been issued for the prototype document. The document has received IRS approval for the form of the plan. The IRS letter is not an opinion of the options that are selected for the operation of the specific plan. The document can be accessed by clicking on the associated link for the document."

Other information may be provided such as information needed to complete the Form 5500 or the results of the current or past Form 5500 audits may be included and accessed from this menu selection. Also, access to previously filed Form 5500s may be provided by selection of a displayed link.

Additionally, documents that are provided to plan participants may be provided to ensure required statements have been disseminated as part of the audit and compliance check. By way of example, a Summary Annual Report ("SAR") may be accessible by the auditor. A SAR is a required statement of the plan's financial status that must be distributed to plan participants. The SAR summarizes the financial information reported on the annual report (Form 5500) in accordance with a specific format prescribed by the Department of Labor ("DOL").

While the user may choose to view the information out of order, the information is preferably provided in an order consistent with standard auditing work papers, such as for example, the "Audits of 401(k) Plans" published by AICPA in order to assist the auditor. By providing information in a uniform order, the auditor is more readily able to locate information and understand that the information is complete. The standard ordering will also decrease the amount of time and effort that the auditor needs to complete the audit work. In this way the audit should be completed at a reduced cost to the ABC Company while allowing the auditor (GHI company) to handle a larger number of audits within the same time period. Additionally, by providing the information to the auditors in this uniform layout, the auditors will have less need to review the physical documents at ABC company's site and less time requesting information from ABC company, and therefore the cost to ABC company is lowered by reducing the manpower needed to support the audit.

In summary, according to a preferred embodiment of the invention, a company 12 offers daily valued defined contribution plans from a second company. A third company such as a plan administrator and accounting 15 administers the funds and ensures compliance of the fund with applicable laws and regulations. The administrator sends reports and other documents to the company 12 and employees of the company 14. To facilitate further accounting and auditing of the funds, the administrator (or company) provides an interface, preferably a website, that provides the auditors 22 or other interested parties with the ability to view the data on the funds according to a template displaying the information as required by the auditor's regulations or in the normal practice of the auditor. For example, many auditors follows the guidelines of auditing organizations such as the "Audits of 401 (k) Plans" published by AICPA. The presented data may be static data (e.g., a fixed document) and may also be dynamic (e.g., a data query interface). The website acts to receive a unique or standard query, run a report from data (or subset thereof) maintained by the administrator to produce a report of interest to the auditor, without requiring the auditor to learn the legacy systems of the administrator. The interface also provides the auditor with the ability to drill down to the underlying data by clicking on the report results or hyperlink or other link to the data. The drill down may retrieve specific documents, a group of documents or exemplary data. Preferably, sufficient documents can be retrieved to ensure the report is correct, for instance by randomly choosing a number of documents for a number of plan members to compare to the report.

By placing the drill down links next to or within the query, the auditor can complete his review of the data in a timely manner. As the auditor is completing a particular step of the audit, the interface provides information (or links to information) pertinent to that particular step in the audit. In addition to providing the information at the time needed, the interface acts to eliminate the requirement of the auditor from learning the legacy systems used by the administrator to gather or maintain the records. Since the interface can search the administrator's data directly, the reports can generate reliable, timely information within the context of the audit step presently performed by the auditor. This further eliminates the need of the auditor to convert raw data into a form usable by the auditor and eliminates the need of the auditor to send requests for information to the company or to the administrator, since the information is directly accessible by the auditor. This is an immense improvement over the current process of assembling boxes of paper from the company or administrator and trying to generate reports by combining and filtering existing paper or electronic reports.

While this invention has been described as having a preferred design, it is understood that it is capable of further modifications, uses and/or adaptations of the invention following in general the principle of the invention and including such departures from the present disclosure as come within the known or customary practice in the art to which the invention pertains and as maybe applied to the central features hereinbefore set forth, and fall within the scope of the invention and the limits of the appended claims. It is therefore to be understood that the present invention is not limited to the sole embodiment described above, but encompasses any and all embodiments within the scope of the following claims.

I claim:

1. A method of displaying accounting data for a fund company having a plurality of employees contributing to a defined contribution plan to employees of a second company, comprising:
  an administrator at a third company collecting and storing records on a computer system for the overall defined contribution plan and having a processor on the computer system; said processor for disallowing access to portions of records on a the computer system for the defined contribution to non-authorized users;
  the administrator registering at least one independent auditor and said administrator causing said processor to provide the independent auditor providing access to the computer system and to all of the employees' accounting data auditing database for the employees' defined contribution plans;
  the administrator, in response to a request from the at least one independent auditor, causing said processor to generate and post a computerized list of selectable reports on the computer system to the least one independent auditor at a fourth company of the defined contribution plan, wherein the processor generates the list of selectable reports is in an electronic template arranged on a computer display on the computer system in sequential order according to a predefined audit layout and includes at least one report on the computer system and viewable on the computer display by at least one auditor showing the combined accounting information for the plurality of employees in one single report;
  wherein selection of at least one selectable report by an auditor causes the processor on the computer system to aggregate and process stored records on the computer system to perform a real time generation and subsequent computer display of an auditing report showing aggregated information about the plurality of employees from said auditing database;
  said auditor using the report to prepare a federal report form to be filed on the overall defined benefit plan.

2. The method of claim 1, wherein the predefined audit layout is in the order and the layout defined in the Audits of 401 (k) Plans as published by AICPA.

3. The method of claim 1, wherein the predefined audit layout comprises reports showing the combined auditing information for the plurality of employees, including:
  a) SAS 70 audits;
  b) Plan documents;
  c) Auditing statements of net assets;
  d) Auditing statement of changes in net assets;
  e) discrimination tests; and
  f) plan tax information.

4. The method of claim 1, wherein the administrator further provides an interactive voice response system for providing information pertaining to the defined contribution plan.

5. The method of claim 1, wherein the predefined audit layout is provided by the independent auditor to the administrator.

6. The method of claim 1, wherein the predefined audit layout is provided by an auditing association.

7. The method of claim 1, wherein the electronic network comprises the Internet.

8. The method of claim 1, wherein the at least one report viewable by at least one auditor showing the combined accounting information for the plurality of employees combines the auditing data for only employees employed by the second company.

9. The method of claim 1, wherein the at least one report viewable by at least one auditor showing the combined accounting information for the plurality of employees combines the auditing data for all employees of all companies having plans administered by said administrator in response to selection of the report.

10. The method of claim 1, wherein the auditor may drill down into a combined accounting data report to see accounting information on a single one of said plurality of employee's contributions.

11. The method of claim 1, wherein the combined accounting information includes all of the data required to file an IRS Form 5500 plan audit and may be viewed by available by selecting reports in the display.

12. The method of claim 11, wherein the combined accounting information includes a plan document, an adoption agreement, and summary plan description for the plan being audited for display in at least one selected report.

13. The method of claim 11, wherein the combined accounting information includes certified statements from a settlement and clearing service for the plan being audited for display in at least one selected report.

14. The method of claim 11, wherein the combined accounting information includes auditing statements of net assets for the plan being audited for display in at least one selected report.

15. The method of claim 11, wherein the combined accounting information includes images of individual promissory notes and loans associated with the plan being audited for display in at least one selected report.

16. The method of claim 1, wherein the at least one report viewable by at least one auditor showing the combined accounting information for the plurality of employees combines the auditing data for only employees employed by the second company.

17. A method of auditing retirement accounts comprising the steps of:
  a) first company offering a defined contribution plan;
  b) a plurality of employees of a second company contributing to the defined contribution plan;
  c) an administrator at a third company collecting and maintain records on a network-accessible computer system for the overall defined contribution plan and for providing access to portions of the defined contribution plan over said network-accessible computer system;
  d) the administrator storing the records on an electronic memory connected with the computer system by the network, where the records include the name, address, and position of employees of the second company; account balances for and contributions to the defined benefit plan by the employees; and the interest on and withdrawals from the defined benefit plan to maintain the accounts of the employees;
  e) the administrator causing a processor on the computer system to generate and post information on a computer display in communication with the computer system in a first report format for at least one employee to view information about the at least one employee's accounting data, and said administrator causing the processor to not allow the at least one employee access to others of the employees of the second company's accounting data;

f) the administrator gathering auditing information and documents about the overall defined contribution plan and placing said information on the electronic memory;

g) the administrator causing the processor to post on an electronic display selectable reporting formats not available to said at least one employee for presenting auditing information about the overall defined contribution plan via a network in a predefined audit layout order format different from said first format, wherein said auditing information includes information on all of the employee's accounting data;

h) an independent auditor registering with the administrator for access to the administrator's electronic memory, and the administrator causing the processor to provide the auditor access to all of the employees' accounting data;

i) selecting at least one selectable reporting format to cause the processor to generate a report on the electronic display of data stored on the administrator's electronic memory over the network, where the auditor may selectively access information on all of the employee's accounting data through the reports;

j) a computer processor associated with the administrator generating a report associated with the at least one selectable reporting format in response to said auditor selection from the auditing information contained on said memory connected with the network;

k) said computer processor transmitting the report to the auditor over the network; and l) said auditor using the report to prepare a federal tax form on the overall defined benefit plan.

18. The method of claim 17, wherein the predefined audit layout order is the order defined in the Audits of 401 (k) Plans as published by AICPA.

19. The method of claim 17, further wherein plan auditing documents may be transmitted to the auditor on request, wherein said plan auditing reports include:
  h) SAS 70 audits;
  i) Plan documents;
  j) Auditing statements of net assets;
  k) Auditing statement of changes in net assets;
  l) discrimination tests; and
  m) plan tax information.

20. The method of claim 17, wherein the predefined audit layout order is provided by the auditor to the administrator.

21. The method of claim 17, wherein the predefined audit layout order is provided by an auditing association.

22. The method of claim 17, wherein the network includes the Internet.

23. The method of claim 17, further comprising said auditor auditing the defined contribution plan using said report.

24. The method of claim 17, further wherein plan auditing documents may be transmitted to the auditor on request, wherein said auditor selects a report from a list presented on a computer screen of the auditor comprising:
  h) SAS 70 audits;
  i) Plan documents;
  j) Auditing statements of net assets;
  k) Auditing statement of changes in net assets;
  l) discrimination tests; and
  m) plan tax information.

25. The method of claim 17, wherein the auditor may drill down into a combined accounting data report to see all of the data required to file an IRS Form 5500 plan audit and may be viewed by available by selecting reports in the display,
  wherein the report includes:
    images of a plan document, an adoption agreement, and summary plan description for the plan being audited for display in at least one selected report;
    certified statements from a settlement and clearing service for the plan being audited for display in at least one selected report;
    auditing statements of net assets for the plan being audited for display in at least one selected report; and
    images of individual promissory notes and loans associated with the plan being audited for display in at least one selected report.

* * * * *

UNITED STATES PATENT AND TRADEMARK OFFICE
CERTIFICATE OF CORRECTION

PATENT NO. : 8,355,964 B2
APPLICATION NO. : 11/747865
DATED : January 15, 2013
INVENTOR(S) : Dema Page 1 of 1

It is certified that error appears in the above-identified patent and that said Letters Patent is hereby corrected as shown below:

In the Claims:

Claim 1, line 52, "defined benefit plan." should be -- defined contribution plan. --

Claim 17, line 63, "benefit plan" should be -- contribution plan --

Claim 17, line 64, "defined benefit plan" should be -- defined contribution plan --

Claim 17, line 40, "defined benefit plan." should be -- defined contribution plan. --

Signed and Sealed this
Twenty-fifth Day of June, 2013

Teresa Stanek Rea
*Acting Director of the United States Patent and Trademark Office*

UNITED STATES PATENT AND TRADEMARK OFFICE
CERTIFICATE OF CORRECTION

PATENT NO. : 8,355,964 B2  Page 1 of 1
APPLICATION NO. : 11/747865
DATED : January 15, 2013
INVENTOR(S) : Dema It is certified that error appears in the above-identified patent and that said Letters Patent is hereby corrected as shown below:

In the Claims:

Claim 1, Column 9, line 52, "defined benefit plan." should be -- defined contribution plan. --

Claim 17, Column 10, line 63, "benefit plan" should be -- contribution plan --

Claim 17, Column 10, line 64, "defined benefit plan" should be -- defined contribution plan --

Claim 17, Column 11, line 40, "defined benefit plan." should be -- defined contribution plan. --

This certificate supersedes the Certificate of Correction issued June 25, 2013.

Signed and Sealed this
Twenty-third Day of July, 2013

Teresa Stanek Rea
*Acting Director of the United States Patent and Trademark Office*